United States Patent [19]
Brice

[11] Patent Number: 5,836,595
[45] Date of Patent: Nov. 17, 1998

[54] COMBINATION STEPLADDER/HANDTRUCK APPARATUS

[76] Inventor: John Nigel Brice, 13431 - 25th Avenue, Surrey, British Columbia, Canada, V4A 1Y8

[21] Appl. No.: 823,285

[22] Filed: Mar. 21, 1997

[51] Int. Cl.$^6$ ........................................... B62B 1/02
[52] U.S. Cl. ................... 280/30; 280/47.18; 280/47.28; 280/652; 182/20
[58] Field of Search ............................ 280/30, 47.27, 280/47.28, 47.29, 643, 645, 651, 652, 47.18, 47.24; 182/20, 21, 104

[56] References Cited

U.S. PATENT DOCUMENTS

| | | | |
|---|---|---|---|
| 1,221,579 | 4/1917 | Olds | 280/30 |
| 1,672,717 | 6/1928 | Gentner | 280/30 |
| 3,104,889 | 9/1963 | Branch, Jr. | 280/30 |
| 3,430,972 | 3/1969 | Fiedler | 280/30 |
| 3,954,155 | 5/1976 | Guidara | 182/70 |
| 4,235,449 | 11/1980 | Tarran | 280/47.28 |
| 4,258,826 | 3/1981 | Munrag | 182/20 |
| 4,494,626 | 1/1985 | Ast | 182/20 |
| 4,934,485 | 6/1990 | Purkopile | 182/20 |

*Primary Examiner*—Richard M. Camby
*Attorney, Agent, or Firm*—John R. Uren

[57] ABSTRACT

A stepladder/handtruck combination is used as a stepladder in a first position and as a handtruck in a second configuration. A plurality of steps are positioned to move between horizontal positions in the stepladder configuration and positions substantially parallel to the frame when the combination is being used in the handtruck configuration. A pair of wheels provides for convenient transport and a support plate used in the handtruck configuration is pivotal about a frame member and assumes a position parallel thereto when the combination is stored. Links connect the steps to the frame and provide for displacement of the steps when the combination is moved between the stepladder and handtruck configurations.

5 Claims, 3 Drawing Sheets

COMBINATION STEPLADDER/HANDTRUCK APPARATUS

This invention relates to a combination stepladder and handtruck apparatus and, more particularly, to a combination stepladder/handtruck apparatus for home and light duty industrial uses.

BACKGROUND OF THE INVENTION

Stepladders are used around the home for many purposes. They are small and convenient to use. Following such usage, they are easy to store out of sight. Handtrucks, however, are used much more infrequently. They are not used around the home often enough to justify the purchase and they are generally stored in a remote location where access is not convenient.

However, handtrucks could be used much more often if they were convenient and could be used for other purposes to offset their relatively limited use in the home. A combination of a handtruck and a portable stepladder offers many conveniences including very little addition room for storage, ease of transport of the stepladder, ready availability for the handtruck and not a great additional cost to the consumer.

SUMMARY OF THE INVENTION

According to one aspect of the invention, there is provided a handtruck/stepladder combination comprising a first frame, wheels attached to said first frame at a position adjacent the lowermost position of said first frame, handles attached to said first frame near the uppermost location of said first frame, a second frame pivotally connected to said first frame at a position adjacent said handles and defining a stepladder in a first position when said second frame extends outwardly from said first frame and defining a handtruck when said second frame extends inwardly and is adjacent too said first frame, a support plate pivotally connected to said second frame at a position adjacent the lowermost position of said second frame, at least two steps pivotally connected to said first and second frames and extending therebetween when said second frame is in said first position and being substantially parallel to said first frame when said second frame is in said second position.

BRIEF DESCRIPTION OF THE SEVERAL VIEWS OF THE DRAWINGS

A specific embodiment of the invention will now be described, by way of example only, with the use of drawings in which.

DESCRIPTION OF SPECIFIC EMBODIMENT

Figure 1:
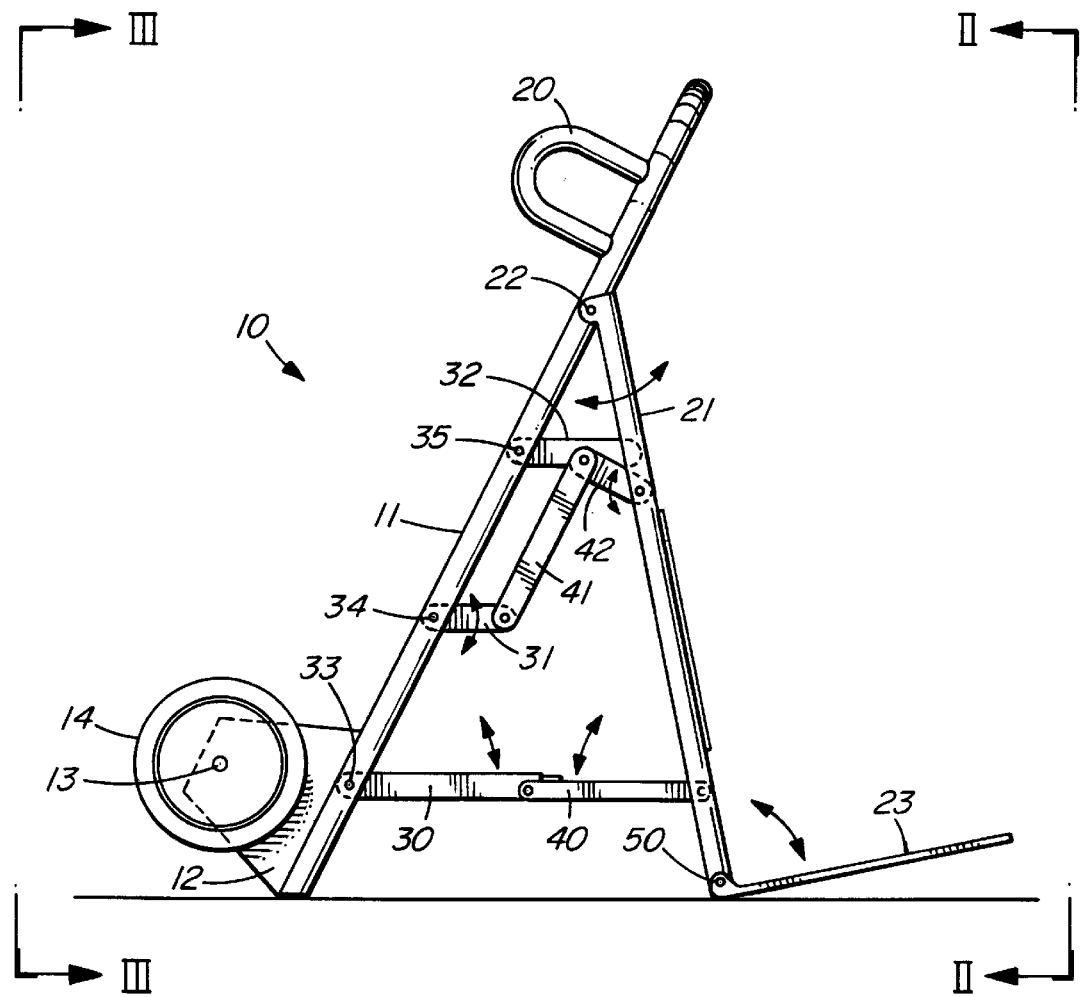
FIG. 1 illustrates a stepladder/handtruck combination according to the present invention with the frame members extended so as to form a stepladder.

Referring now to the drawings, a stepladder/handtruck combination according to the present invention is generally illustrated at 10 in FIG. 1.

Figure 3:
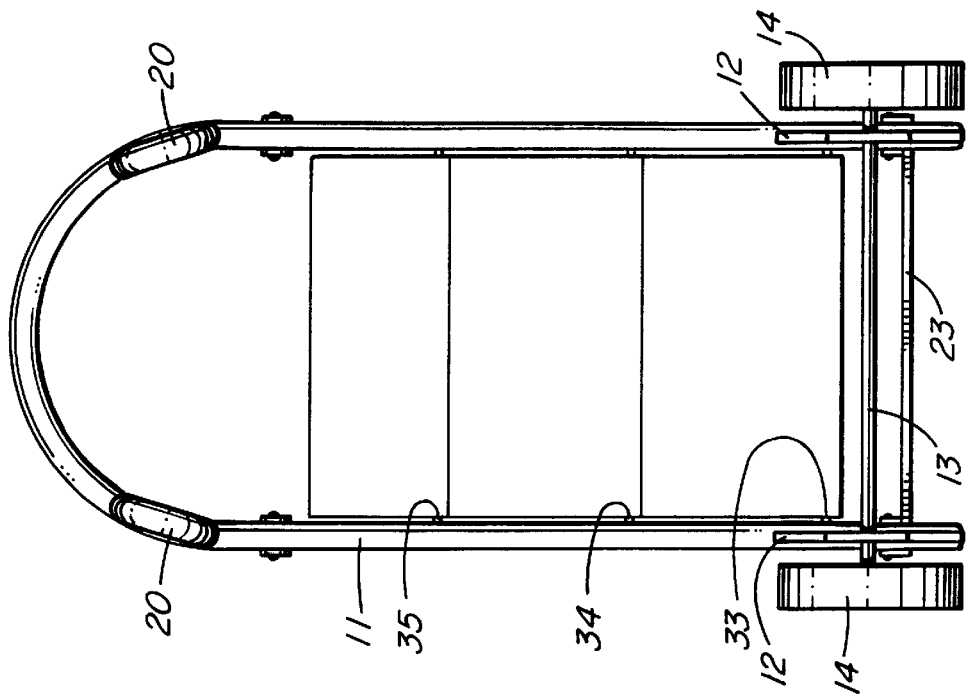
FIG. 3 is a view similar to FIG. 2 but taken from the left along III—III, again with the apparatus in its closed position.

It comprises a first frame 11 made from tubular steel formed into a U-shape as best seen in FIG. 3. A pair of brackets 12 are welded to the frame 11 at a position near the lowermost point of the frame 11. A rod 13 extends across the distance between the two brackets 12 and is perpendicular to the longitudinal axis of the first frame 11. Two wheels 14 are mounted on the rod 13 with appropriate washers and cotter pins (not shown). A pair of handles 20 in the shape of U-members are also connected to the first frame 11 by welding to provide easy handholds for the operator.

A second frame 21 is pivotally connected to the first frame 11 at axes 22 at two locations, one on each side of the first frame 11. Second frame 21 is movable between two locations, the first or open location being illustrated in FIG. 1 wherein the stepladder/handtruck combination 10 is generally used as a stepladder, and a second or closed position being illustrated in FIG. 4 wherein the stepladder/handtruck combination 10 is generally used as a handtruck.

Figure 2:
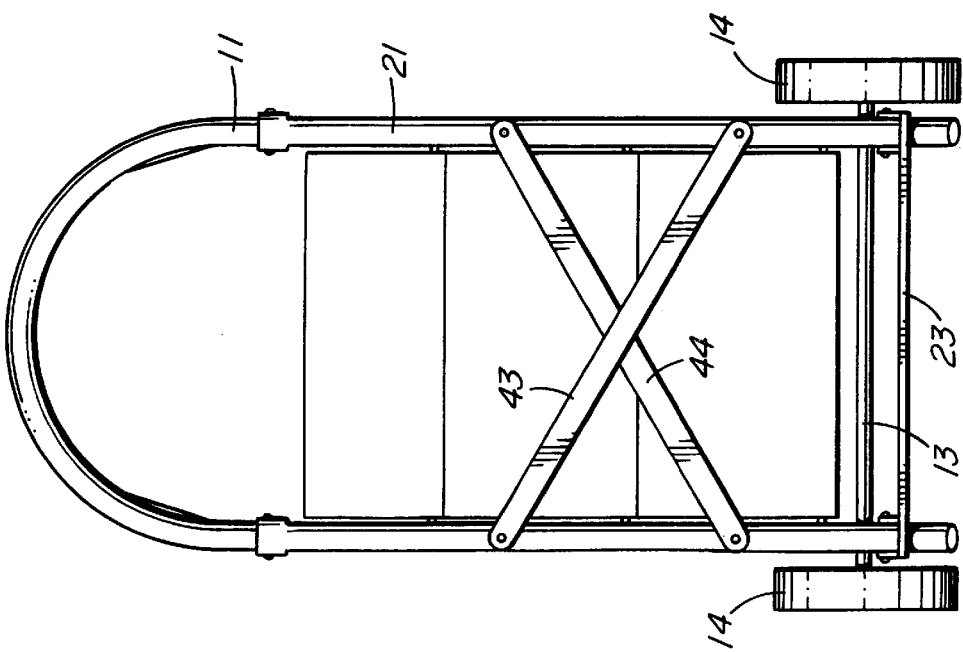
FIG. 2 is a view from the right of FIG. 1 along II—II but with the apparatus in its closed position.

A support plate 23 is pivotally connected to the second frame 21 about axes 24. The support plate 23 abuts the frame 21 in the downward position as best seen in FIG. 2 so that the maximum downward position is that illustrated in FIGS. 1 and 3. Support plate 23 is rotatable upwardly and may assume a position parallel and adjacent to second frame 21 when it is collapsed and when the stepladder/handtruck combination 10 is being stored or transported.

Three steps 30, 31, 32 are pivotally attached to first frame 11 about axes 33, 34, 35, respectively. Each step 30, 31, 32 is adapted to extend substantially horizontally when the stepladder/handtruck combination is used in its stepladder configuration as illustrated in FIG. 1.

Links 40 are pivotally mounted between second frame 21 and first step 30. Links 41, 42 are mounted between second step 31, third step 32 and second frame 21 as is illustrated in FIG. 1. The links 40, 41, 42 allow the steps to move between a first position where the steps 30, 31, 32 are substantially horizontal in a stepladder configuration and a second position where the steps 30, 31, 32 are substantially parallel with the first frame 11 such as when the stepladder/handtruck combination is used in the handtruck configuration as illustrated in FIGS. 3 and 4.

A pair of cross-reinforcing members 43, 44 are mounted between the members of second frame 21 to provide additional strength and integrity to the stepladder/handtruck apparatus 10.

OPERATION

Figure 4:
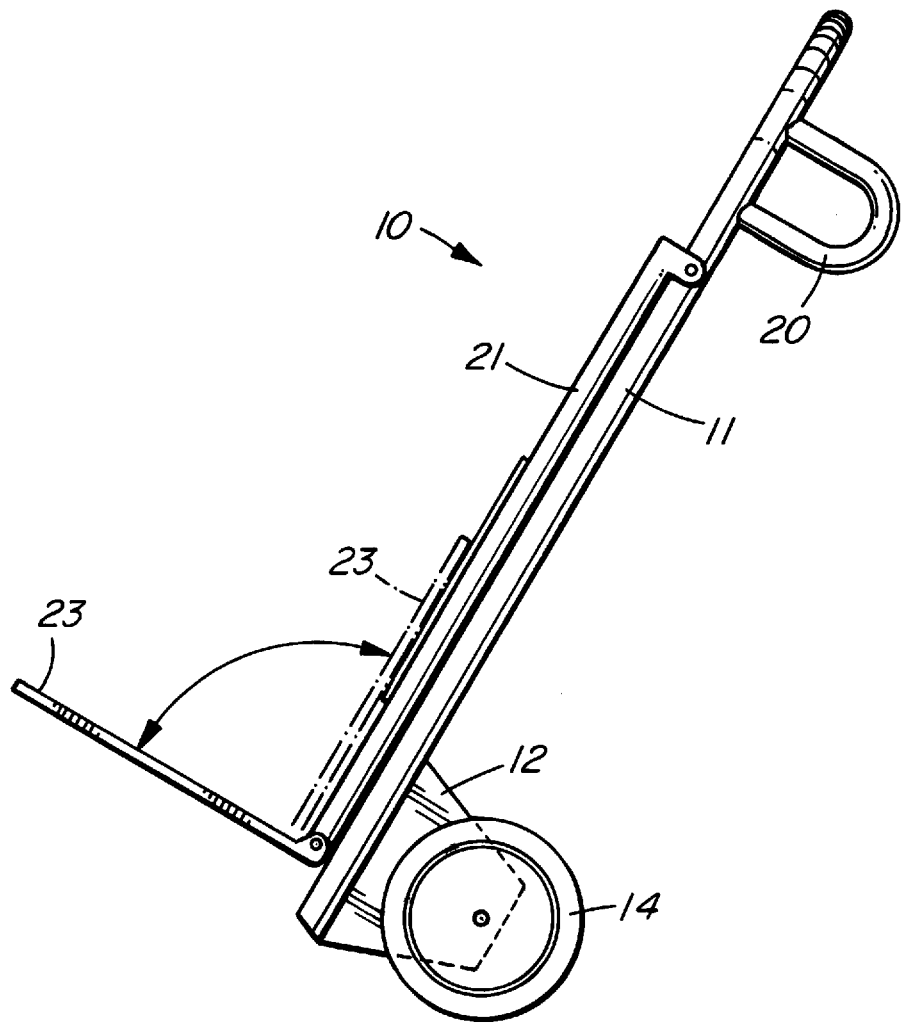
FIG. 4 is a view similar to FIG. 1 but illustrating the stepladder/handtruck combination in its closed position and operable to be primarily used as a handtruck.

In operation, it will initially be assumed that the stepladder/handtruck combination 10 is in the storage position illustrated in FIG. 4 except that the support plate 23 will have originally been in the position illustrated in phantom in FIG. 4. The support plate 23 will be rotated downwardly and the stepladder/handtruck combination 10 will be available for use as a handtruck, with the wheels 14 contacting the ground and the handles 20 available for ease of handling by an operator. It may be transported to a desired location, the support plate 23 will be positioned for supporting a load intended to be conveyed and, thereafter, the load will be transported all of which is readily known.

In its alternative configuration as a stepladder, the combination 10 will appear as is illustrated in FIG. 1. In this position, the wheels 14 will be out of contact with the ground or floor and the first and second frames 11, 21 will assume the position illustrated therein with the steps 30, 31, 32 assuming a substantially horizontal configuration and the second frame being supported on the ground or floor at its lowermost end 50. The user may conveniently climb up the steps again as is readily known.

A convenience in the stepladder configuration is that the stepladder/handtruck combination can be easily transported by the wheels 14 intended primarily for the handtruck configuration whereas with an ordinary stepladder, the stepladder must be manually carried from the storage location to the location of use.

Although a specific embodiment of the invention has been described, such description is by way of example only and should not be construed as limiting the scope of the invention as defined in accordance with the accompanying claims.

I claim:

1. A handtruck/stepladder combination comprising a first frame, wheels attached to said first frame at a position adjacent the lowermost position of said first frame, handles attached to said first frame near the uppermost location of said first frame, a second frame pivotally connected to said first frame at a position adjacent said handles and defining a stepladder in a first position when said second frame extends outwardly from said first frame and defining a handtruck when said second frame extends inwardly and is adjacent too said first frame, a support plate pivotally connected to said second frame at a position adjacent the lowermost position of said second frame, at least two steps pivotally connected to said first and second frames and extending therebetween when said second frame is in said first position and being substantially parallel to said first frame when said second frame is in said second position.

2. Stepladder/handtruck combination as in claim 1 wherein said steps are pivotally connected at one end to said first frame and by links extending between each of said steps and said second frame.

3. Stepladder/handtruck combination as in claim 2 and further comprising a third step, said link of said second step extending between said second step and said third step and said link of said third step extending between said second step and said second frame.

4. Stepladder/handtruck combination as in claim 3 and further comprising reinforcing members extending between said opposite sides of said second frame.

5. Stepladder/handtruck combination as in claim 4 wherein said support plate is movable between a first position wherein it contacts said second frame in its lowermost or support configuration to restrict further movement of said support plate and a second position wherein said support plate is pivotally moved upwardly and assumes a position parallel to said second frame.

\* \* \* \* \*